July 14, 1964
A. H. RICH
3,140,844
AIRCRAFT STABILIZATION DEVICE
Filed March 29, 1963
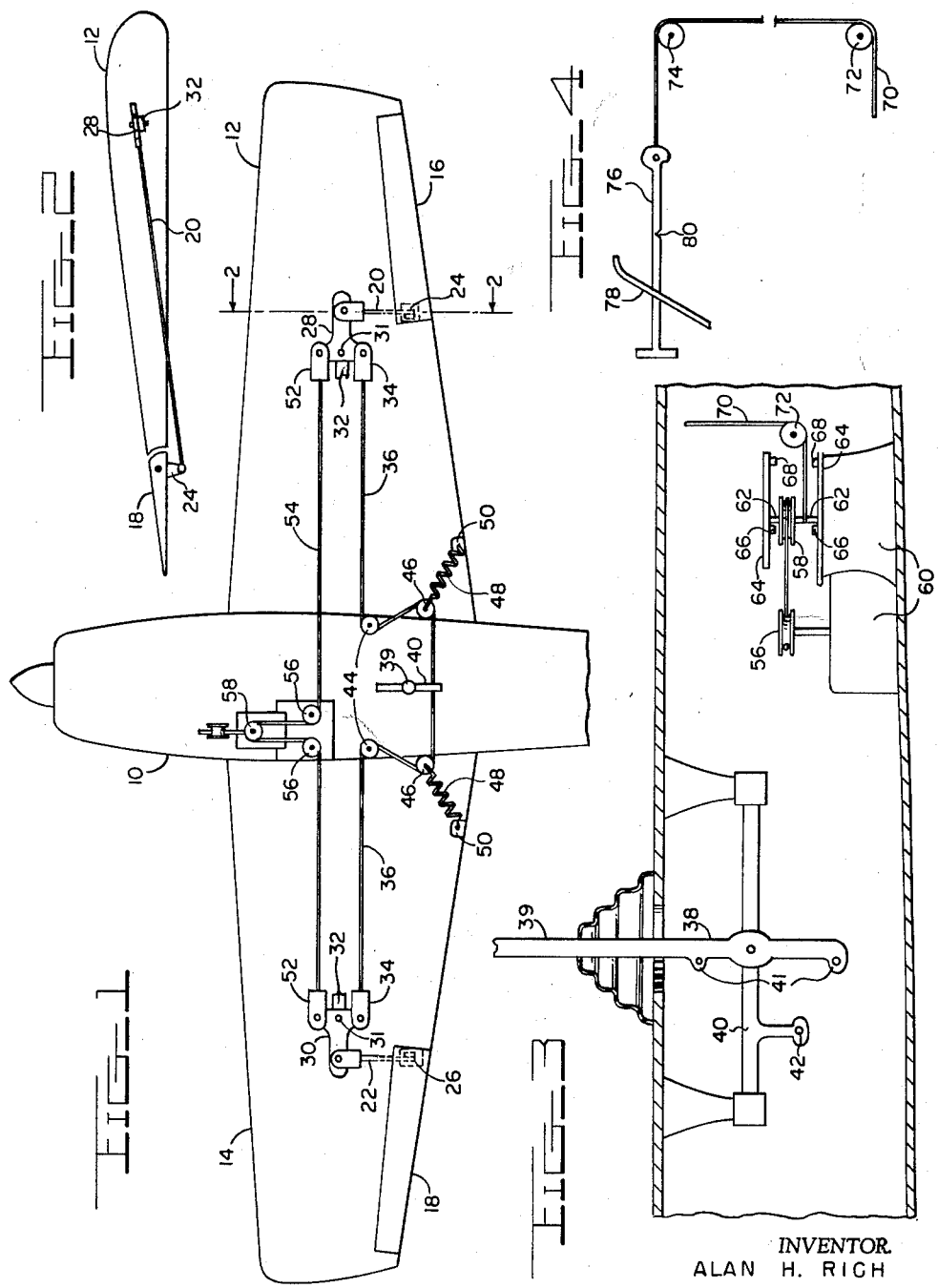
INVENTOR.
ALAN H. RICH
BY
ATTORNEY 3,140,844
AIRCRAFT STABILIZATION DEVICE
Alan H. Rich, 4519 Alabama Ave. SE.,
Washington 19, D.C.
Filed Mar. 29, 1963, Ser. No. 269,214
6 Claims. (Cl. 244—82)
(Granted under Title 35, U.S. Code (1952), sec. 266)

The invention described herein may be manufactured and used by or for the Government of the United States of America for governmental purposes without the payment of any royalties thereon or therefor.

The present invention relates to aircraft stabilization means and more particularly to a device for automatically reorienting an aircraft from a spiral or turning condition to one of level flight.

The problem of reorienting an aircraft which is in a condition of spiral flight is not a critical one where the pilot is experienced and outside visual references such as the horizon are available. However, where the pilot is inexperienced and the possibility of panic can worsen the situation rather than rectify it, or where even the experienced pilot is flying "blind," some means for permitting the plane to reorient itself is desirable. Several methods of accomplishing this reorientation automatically have been proposed. These systems generally require apparatus such as venturi tubes, pitot tubes, scoops or other pressure or speed sensing devices to be mounted on each wingtip, pressure carrying lines to be mounted in each wing, a transducer for converting the differential pressure sensed at the wingtips into a mechanical output and mechanical transmission means for transmitting the output to the ailerons. This equipment is comparatively expensive and adds undesirable weight to the aircraft. Where it is desired to employ one of these systems on an existing aircraft, extensive modification is necessary, which also adds to the ultimate cost.

The present invention eliminates substantially all of this additional equipment by employing the ailerons themselves as the condition sensing elements and also as the force converting and transmitting means.

According to the aircraft stabilization device of this invention there is inserted into the conventional aileron control system a cable shortening mechanism adapted to be pilot activated and associated with one of the cables of the aileron control system in a manner which permits that cable to be shortened, thus placing both ailerons in a downward extending position as opposed to a streamlined or non-active position. The greater surface pressure created on the bottom surface of the aileron of the faster moving or outside wing causes that aileron to move upward with a complementary downward movement of the opposite aileron. As the wings approach a level position and equal speed, the ailerons will move from an initial skewed relationship to a parallel orientation due to the gradual equalization of pressure on the underside of the ailerons.

It is therefore an object of the present invention to provide a simple and reliable means for stabilizing aircraft flight.

Another object is to provide a mechanism for automatically reorienting an aircraft to straight flight which is in a spiral or turning condition of flight.

A further object of the present invention is the provision of a method for correcting aircraft attitude from that of a spiral condition to one of straight flight.

Still another object of the invention is to provide an aircraft stabilization system wherein the aircraft's ailerons are the sole condition sensing and correcting means.

These and other objects along with many of the attendant advantages of the present invention will be readily appreciated when the following detailed description is considered in conjunction with the accompanying drawings in which:

FIG. 1 is a schematic view of a conventional aileron control system with the stabilizing mechanism of the present invention interposed therein.

FIG. 2 is a section view taken along the line 2—2 of FIG. 1.

FIG. 3 is a side elevation partly in section of a conventional control stick and the operating mechanism of the present invention, and FIG. 4 is a diagrammatic view of the actuation mechanism of the present invention.

Referring now in detail to the drawings wherein like reference characters represent like parts and more particularly to FIG. 1, there is shown the outline of a conventional aircraft generally designated 10 including a right wing 12 and a left wing 14. Each of the wings 12 and 14 carry conventional aileron surfaces respectively designated 16 and 18. The conventional aircraft aileron control system includes a pair of push rods 20 and 22 pivotally connected at their exterior ends to the aileron under surfaces at 24 and 26, respectively, and to the apexes of a pair of complementary actuated bell cranks 28 and 30 at their interior ends. The bell cranks 28 and 30 are each pivotally mounted at 31 on rigid wing members 32. The rearward arms 34 of bell cranks 28 and 30 are connected by a flexible cable 36 to the pilot control stick mechanism generally designated 38, and fixedly secured to bearing mounted roll bar 40 at 42. Cables 36 each pass over a pair of pulleys 44 and 46. Pulleys 36 are resiliently mounted for planar movement under the influence of springs 48 secured to rigid wing members 50, thus taking up any slack produced in cables 36, keeping said cables continually in a tensioned condition. Pulleys 44 are secured in a fixed position to the aircraft structure.

The forward legs 52 of bell cranks 28 and 30 are conventionally directly connected by a flexible cable 54.

Under normal operation the aircraft is controlled by operation of stick 39, forward and backward movement causing the elevators on the tail to be raised or lowered by cables connected to the control mechanism at 41. Movement about the roll axis of the aircraft is controlled by movement of stick 39 laterally causing bearing mounted roll bar 40 to rotate in its bearings, thus through the above described cable and bell crank system, lowering one aileron and raising the other to produce turning or banking movement. The slack produced in cable 36 connected to the aileron being lowered is taken up by the spring urged pulley 46 on that side of the system.

According to the present invention a pair of fixed pulleys 56 and a movable pulley 58 are inserted in the system to control the direction of a slightly longer cable 54. Support bases 60 are secured to the interior of the bottom of the aircraft to place the pulley system 56–58 in substantially the same plane as the cable system and roll bar connection 42. This prevents binding of the cables in the pulleys and, of course, the ideal control system should be frictionless and although this is not possible, the reduction of friction to a minimum level produces optimum sensitivity to the control system of the present invention.

Pulley 58 is mounted for rotation on spindles 62, which are in turn mounted in guide members 64 for slidable movement between a normal position defined by stops 66 and an activated position defined by a pair of stops 68. An actuating cable 70 is connected at one end to spindle 62, directed upwardly by a pulley 72, then rearwardly by a pulley 74 and connected at its other end to a T-type actuating handle 76 extending through the dashboard or instrument panel 78 in front of the pilot.

In operation, when the aircraft is in a turning or spiral condition of flight, the pilot merely pulls handle 76 causing pulley 58 to be moved from a normal condition adjacent stops 66 to an extended or actuated position adjacent stops 68. The handle may be held in this actuated position by hand or latched in that position by a notch 80 provided in the handle 76 for that purpose. This movement of pulley 58 causes both sections of cable 54 between bell crank legs 52 and the pulleys 56 to be shortened, and bell cranks 28 and 30 to pivot in a direction toward the nose of the aircraft about their pivotal mountings 31. The accompanying lengthening of cables 36 will be taken up by movement of pulleys 46 under the urging of springs 48 and hence cables 36 will remain under tension. Motion of the bell cranks in this direction will cause both ailerons 16 and 18 to be pivoted in a downward direction in response to the forward movement of push rods 20 and 22.

With the aircraft in a turning or spiraling condition, the faster moving or outside wing will have a different and greater pressure on the underside of its aileron than that acting on the aileron of the slower moving or inside wing. This difference in pressure will cause the aileron of the faster moving wing to be moved upward, transmitting a complementary additional downward movement to the aileron of the slower moving wing until an equilibrium condition is reached with the ailerons in a skewed relationship.

Although both ailerons will be in a downward position with respect to the plane of the wings, the slower moving aileron will be at a substantially greater angle of divergence from that plane, causing the lower and slower wing to be raised while the faster moving wing will be lowered and slowed. As the wings begin to approach a condition of straight flight, the aileron of the initially slower moving wing will be raised and that of the faster moving wing lowered until the pressures on both are equal and the ailerons return from their skewed relationship to a parallel relationship. At this point handle 76 can be returned to its inactive position thus returning pulley 58 to its normal position adjacent stops 62, and ailerons 16 and 18 to their streamlined position and normal pilot controlled flight may be resumed.

Of course, it is to be understood that at any time during the operation of the stabilizing mechanism the position of the ailerons with respect to each other can be controlled by the pilot through stick 39 by overriding the effect of the pressure balance.

As can be seen from the foregoing, the present invention provides an inexpensive aircraft stabilization system whereby the ailerons alone act as both the condition sensing and correcting means, thus eliminating the necessity for employing a multiplicity of auxiliary equipment to perform these functions.

Obviously many modifications and variations of the present invention are possible in light of the foregoing teachings and it is to be understood that the scope of this invention is to be limited only by the appended claims and not otherwise.

What is claimed is:

1. A system for reorienting an aircraft having conventional aileron roll controls from a turning or spiral condition of flight to a straight line condition of flight comprising,
   (a) means for simultaneously moving both ailerons of said aircraft to a downwardly extending position,
   (b) tensioned means directly interconnecting said ailerons whereby upward movement of the aileron of the faster moving wing, due to the greater air pressure acting on the under side thereof, will transmit an additional downward movement, equal in magnitude to said upward movement, to the aileron of the slower moving wing, said tensioned interconnecting means gradually returning said ailerons to a parallel position as the pressures acting on said ailerons equalize and the aircraft approaches straight flight.

2. A system for reorienting an aircraft having conventional aileron roll controls from a turning or spiral condition of flight to a straight line condition of flight comprising,
   (a) an aileron on each wing of said aircraft,
   (b) pivotally mounted actuating means connected to each of said ailerons,
   (c) tensioned cable means interconnecting said actuating means,
   (d) pilot control means connected to said cable means for transmitting motion to said ailerons equal in magnitude but opposite in direction,
   (e) normally inactive cable shortening means interposed along said cable intermediate said actuating means, and
   (f) means for activating said cable shortening means whereby upon activation of said cable shortening means both of said ailerons will be simultaneously moved to a downwardly directed position.

3. A system for automatically returning a conventional aircraft in a spiral or turning condition of flight to stabilized flight comprising,
   (a) an aileron on each wing of said aircraft,
   (b) a bell crank pivotally mounted in each wing adjacent one of said ailerons,
   (c) actuating means connecting the apex of each bell crank to the underside of its adjacent aileron,
   (d) a pair of cables under tension, one of said cables interconnecting first legs of each of said bell cranks and the other of said cables interconnecting second legs of each said bell cranks,
   (e) a pilot control stick connected to said other cable intermediate said bell cranks,
   (f) resilient means connected to said other cable to maintain said other cable under tension, and
   (g) a cable shortening mechanism including a movable pulley interposed along said one cable intermediate said bell cranks, whereby when said pulley is moved in one direction, the effective length of said one cable is shortened thereby moving simultaneously both of said ailerons to a downwardly extending position.

4. A system for automatically returning a conventional aircraft in a spiral or turning condition of flight to stabilized flight comprising,
   (a) first and second ailerons on the wings of said aircraft,
   (b) first and second bell cranks pivotally mounted in each wing adjacent said first and second ailerons respectively,
   (c) means connecting each of said bell cranks to an adjacent aileron,
   (d) flexible means, under tension, connecting said first bell crank to said second bell crank,
   (e) pilot control means,
   (f) cable means connecting said first and second bell cranks to said pilot control means,
   (g) resilient means connected to said cable means to maintain said cable means under tension, and
   (h) a normally inactive shortening mechanism interposed along said flexible means whereby when said flexible means is shortened thereby said ailerons are moved to a downwardly extending position in response to pivotal movement of said bell cranks.

5. A system for automatically returning a conventional aircraft in a spiral or turning condition of flight to stabilized flight comprising,
   (a) first and second ailerons, respectively positioned on the trailing edges of opposite wings of the aircraft,
   (b) first and second bell cranks pivotally mounted in said wings adjacent said first and second ailerons respectively, (c) a push rod connecting the apex of each bell crank to the underside of the adjacent aileron,
(d) a cable under tension connecting a first leg of said first bell crank to a first leg of said second bell crank,
(e) a pilot control mechanism,
(f) cable means connecting the second legs of said first and second bell cranks to said pilot control mechanism,
(g) resilient means connected to said cable means to maintain said cable means under tension,
(h) first, second, and third pulleys associated with said cable, said first pulley producing a 90° turn in said cable, said second pulley producing a 180° turn in said cable and said third pulley producing a 90° turn in said cable, said second pulley being mounted for linear movement in a direction perpendicular to the ends of said cable,
(i) and activating means connected to said second pulley for moving said second pulley in a direction to cause the ends of said cable to be moved toward each other thereby causing said bell cranks to move both of said ailerons to a downwardly extending position.

6. A system for reorienting an aircraft from a turning or spiral condition of flight to a straight line condition of flight comprising,
(a) an aileron on each wing of said aircraft,
(b) actuating means connected to each of said ailerons,
(c) tensioned means interconnecting said actuating means, and,
(d) normally inactive means for shortening said tensioned means whereby upon activation of said inactive means both of said ailerons will be simultaneously moved to a downwardly directed position.

References Cited in the file of this patent

FOREIGN PATENTS 7,209    Great Britain _____ Mar. 25, 1909